United States Patent [19]

Fredrickson et al.

[11] 4,262,406
[45] Apr. 21, 1981

[54] METHOD OF ASSEMBLING STRAPPING

[75] Inventors: Lloyd A. Fredrickson, Denver; James G. VanAusdall, Englewood, both of Colo.

[73] Assignee: Ceel-Co, Lakewood, Colo.

[21] Appl. No.: 84,292

[22] Filed: Oct. 12, 1979

[51] Int. Cl.³ .................................................. B23P 19/04
[52] U.S. Cl. ..................................... 29/433; 29/455 R; 29/526 R; 24/22; 24/23 B; 24/200
[58] Field of Search ................. 29/455 R, 526 R, 433, 29/241; 24/23 R, 23 B, 200

[56] References Cited

U.S. PATENT DOCUMENTS

| Re. 8,679 | 4/1879 | Sheppard | 24/23 B |
|---|---|---|---|
| Re. 13,680 | 1/1914 | Hirsh | 24/200 |
| 19,490 | 3/1858 | Cook | 24/23 B |
| 81,374 | 8/1868 | Irvine | 24/23 B |
| 151,483 | 6/1874 | Flickinger | 24/23 B |
| 701,259 | 5/1902 | De Haven | 24/23 B |
| 1,436,448 | 11/1922 | Kimball et al. | 24/23 B |
| 2,462,264 | 2/1949 | Hess | 24/23 B |
| 3,447,208 | 6/1969 | Beach | 24/23 B |

Primary Examiner—Charlie T. Moon
Attorney, Agent, or Firm—Ancel W. Lewis, Jr.

[57] ABSTRACT

A strap fastener and method for securing a strap to the fastener for forming a tight loop for strapping an object. The fastener is a one-piece, generally rectangularly shaped body having either a single slot or a pair of slots providing a pair of opposed inside edges, an intermediate slot, and an end slot with all slots being sized to receive flexible strap. A length of strap is wrapped around an object and secured in a tight loop to the fastener by a method which includes the steps of threading a first end portion of the strap through the fastener between the opposed inside edges and out through the end slot, pulling the first end portion of the strap around the object to be strapped, threading the first end portion of the strap through the fastener between the inside edges and folding the first end portion back upon itself to form a first strap looped end portion, pulling a second end portion of the strap while holding the fastener to tighten the strap around the object to be strapped, threading the second end portion of the strap through the intermediate slot and out through the end slot to form a second strap looped end portion, and folding the second end portion of the strap back upon itself and then through the fastener between the opposed inside edges.

3 Claims, 10 Drawing Figures

METHOD OF ASSEMBLING STRAPPING

TECHNICAL FIELD

This invention relates to the strapping of objects and more particularly to a novel and improved method and apparatus for securing the ends of a length of strap to form a tight loop for strapping an object.

It is often necessary to utilize strapping material to construct or package an object. In packaging, for instance, straps are used frequently in wrapping and boxing articles and in securing a plurality of articles to one another. Another area where strapping is often utilized is in the installation of protective jackets around insulated piping and the like. The present invention is particularly suited for the installation of such protective jackets.

BACKGROUND ART

A variety of strapping assemblies and methods of fastening with straps have heretofore been provided. U.S. Pat. No. 19,490 to Cook discloses a strap fastener of this general type.

One problem with known prior art strap fasteners is that in general they are difficult to use. Special tools are often required to thread and tension the strap and to attach the fastener to the strap. In addition, most prior art strap fasteners have an irregular profile that projects from the strapped object. Moreover, with most prior art strap fasteners the ends of the straps are not positively retained and thus dangle loosely from the fastener.

With the strapping assembly and method of the present invention, on the other hand, a strap can be tightened and positively secured around an object without special tools and without loose strap ends. In addition, the fastener is of a one-piece construction and has no moving parts or surfaces that project out from the strapped object. Moreover, the strap may be unrolled from a roll of material and attached directly to the fastener without the need for precutting the strap into lengths. Additionally, the strap may be easily removed and attached to the fastener again without special tools.

DISCLOSURE OF INVENTION

A strapping assembly and method for securing flexible strap to a fastener for forming a tight loop for strapping an object. The fastener is of a one-piece construction and in a preferred embodiment includes a slot arrangement with laterally extending slots sized to slidably receive a strap having a pair of opposed laterally extending inside edges between which the strap will pass and against which looped end portions of the strap are pulled. A length of strap is wrapped around an object and secured in a tight loop to the fastener by a method including the steps of threading a first end portion of the strap through a slot arrangement having opposed inside edges provided by either a single slot in a three-slot fastener or a pair of slots in a four-slot fastener, and out through an end slot in the fastener, pulling the first end portion of the strap around the object to be strapped, threading the first end portion of the strap through the fastener between the opposed inside edges and folding the end back upon itself, pulling an opposite second end portion of the strap while holding the fastener to tighten the strap around the object to be strapped, threading the second end portion of the strap through an intermediate slot in the fastener and out through the end slot, and folding the second end portion of the strap back upon itself and then through the fastener between the opposed inside edges.

The four-slot arrangement facilitates having the opposite looped end portions of the strap in different slots and the strap passes through the slots no more than twice, while in three-slotted fasteners the looped end portions share the same slot.

BRIEF DESCRIPTION OF DRAWING

The details of this invention will be described in connection with the accompanying drawing, in which.

DETAILED DESCRIPTION

Figure 1:
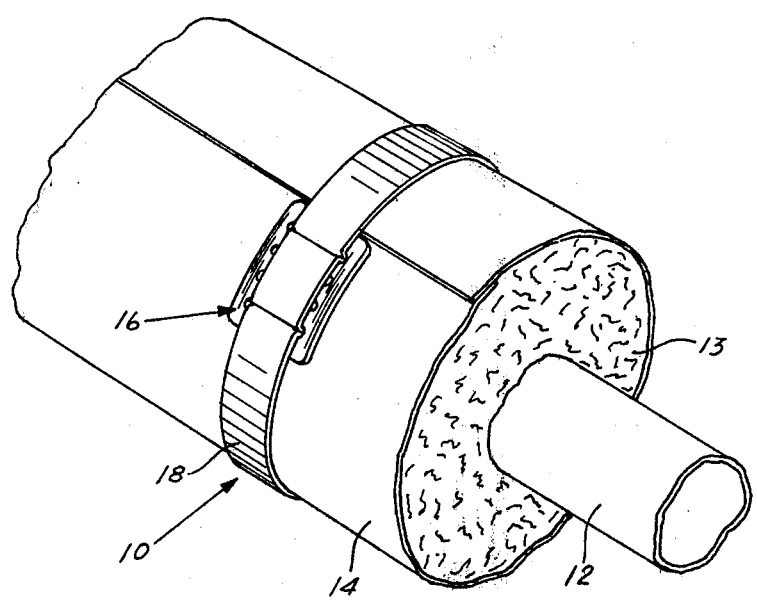
FIG. 1 is a perspective view of a length of pipe having a protective jacket secured thereto in accordance with the strapping assembly and method of the present invention.

Referring now to FIG. 1, the strapping assembly is generally designated by numeral 10. The strapping assembly 10 is shown secured to a length of pipe 12 having insulation 13 for attaching a protective jacket 14 to the insulated pipe 12. Jackets of this type are disclosed in U.S. Pat. No. 3,560,287 which is assigned to the assignee of the present invention and have overlapping side edge portions. The strapping assembly 10, generally stated, comprises the combination of a strap fastener 16 and a length of strap 18 secured around the pipe jacket 14 to the fastener 16 by a method which will hereinafter be described.

Figure 2:
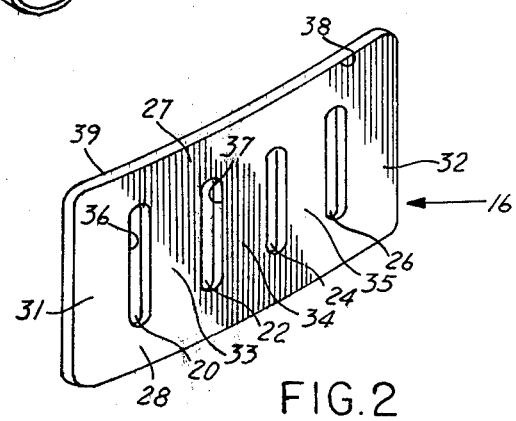
FIG. 2 is a perspective view of a four-slot strap fastener embodying features of the present invention.

Referring now to FIG. 2, the strap fastener 16 shown is in the form of a relatively thin body or plate having an elongated generally rectangular peripheral configuration and is formed with four equally spaced through slots 20, 22, 24 and 26 that are of a corresponding size and shape. Each slot is arranged with its longitudinal axis transverse to the length of the fastener.

The fastener then has opposed side portions 27 and 28, opposed end portions 31 and 32, and laterally extending intermediate portions 33, 34 and 35. The corners of the fastener and the slots are rounded or radiused. This slot arrangement uses the first two slots 20 and 22 to provide a pair of oppositely disposed, laterally extending, inner side edges 36 and 37 around which the opposite strap looped end portions of the strap 18 are looped and bear against to be held in place as described hereinafter. Slot 24 is an intermediate slot and slot 26 is an end slot.

The fastener 16 shown is of a slightly convex shape to fit snugly against a cylindrical object such as the insulated pipe 12. The strap fastener 16 has an outer face 38 and an inner face 39. As used herein, the term "outer face" or "outside face 38" refers to the outside surface of the strap fastener 16 when the fastener is secured to an object such as is shown in FIG. 1. The term "inner face" or "inside face 39" refers to the inside surface of the strap fastener which is in contact with the strapped object.

The strap fastener 16 is of a one-piece unitary construction and may be formed of a lightweight strong material such as plastic, aluminum, steel or stainless steel. The edges of the strap fastener 16 and slots 20, 22, 24 and 26 are preferably smooth and burr-free to allow the strap 18 to be easily slid over the fastener and be freely slidable through the slots. The outside dimensions, shape, and thickness of the strap fastener 16 may be sized to conform to the object being strapped, the strap size, and the fastener material.

The strap 18 is preferably fabricated of flexible plastic material. Alternatively, the strap may be fabricated from any other suitable flexible material such as thin-guage metal. In practice it has been found that flexible plastic strap in widths from approximately ¼ inch to approximately 2 inches and in thicknesses from a minimum of approximately 0.010 inch to approximately 0.090 inch is suitable for most applications. As will hereinafter be explained, the strap may be threaded into the strap fastener and around the strapped object while still attached to a roll of material. This eliminates the need to precut the strap into predetermined lengths for installation.

Figure 4:
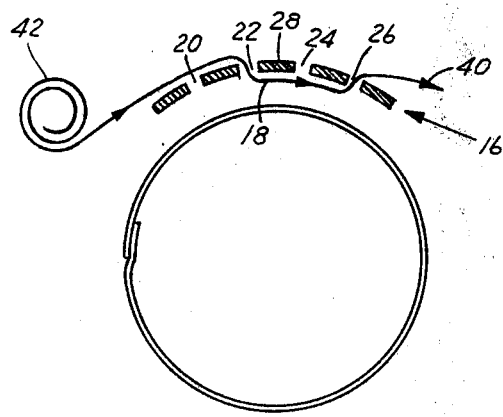
FIG. 4 is a schematic view of a strap and the strap fastener of FIG. 2 showing a step of a method of securing the strap to the fastener and around an object.

Referring now to FIGS. 4 through 8, steps of a method of securing the strap 18 in a tight loop around the protective jacket 14 and insulated pipe 12 are shown in schematic form. As shown in FIG. 4, to begin the method the strap fastener 16 is first held with its outer side up. One end portion 40 of the strap 18, while the strap remains attached to a roll of strap material 42, is then threaded from the outside of the fastener through slot 22. The strap is then pulled along the inner side of the fastener and threaded back out through end slot 26. Enough strap 18 is then pulled through the fastener to encircle the pipe 12, insulation 13 and protective jacket 14.

Figure 5:
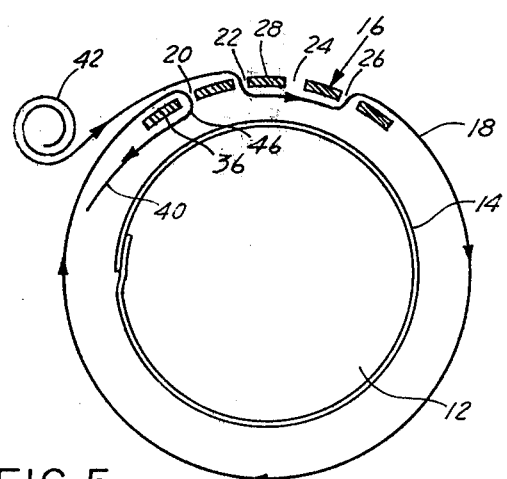
FIG. 5 is a schematic view of a strap and the strap fastener of FIG. 2 showing another step of a method of securing the strap to the fastener and around an object.

Next, as shown in FIG. 5, the strap 18 is placed around the protective jacket 14 and pipe 12. The end portion 40 of the strap 18 is then threaded from the outside of slot 20 through the slot and is folded back upon itself to form one strap looped end portion 46 that bears against inside edge 36 as shown. The strap fastener 16 can then be held snugly against the protective jacket and the roll of strap 42 pulled until the strap is as tight around the protective jacket 14 as desired.

Figure 6:
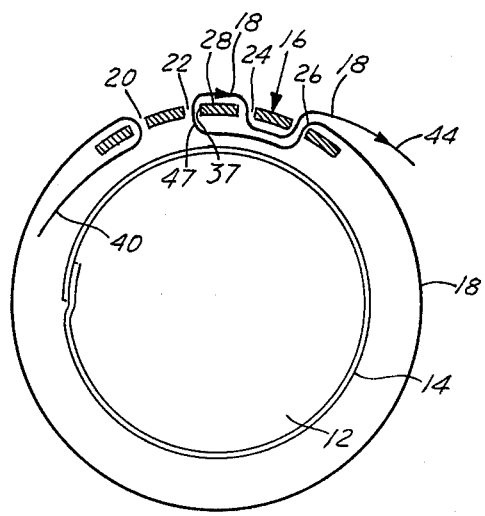
FIG. 6 is a schematic view of a strap and the strap fastener of FIG. 2 showing yet another step of a method of securing the strap to the fastener and around an object.

Next, as shown in FIG. 6, while the fastener 16 is continuously held against the protective jacket 14, the strap 18 is folded back upon itself at slot 22 to form an opposite strap looped end portion 47 that bears against inside edge 37. The strap 18 is then cut from the roll of material 42, forming an opposite end portion 44 of the strap. The opposite end portion 44 is preferably made several inches beyond the fold at slot 22 in the strap. End portion 44 of the strap is then threaded through the outer side of intermediate slot 24, along the inner side of the fastener 16, and back out through end slot 26.

Figure 7:
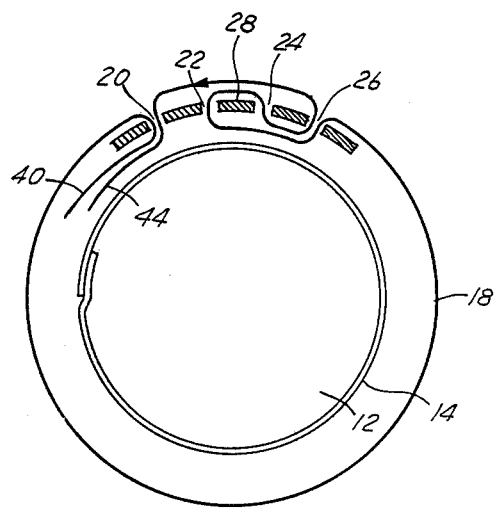
FIG. 7 is a schematic view of a strap and the strap fastener of FIG. 2 showing the strap secured to the fastener around an object.
Figure 8:
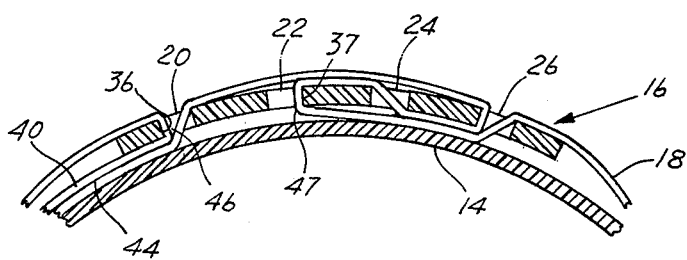
FIG. 8 is a cross-sectional view of FIG. 4.

Next, as shown in FIG. 7, end portion 44 of the strap can then be folded back upon itself at end slot 26 and threaded back through slot 20. The cut end may then be tucked under end portion 44 so that there are no exposed loose ends.

Figure 3:
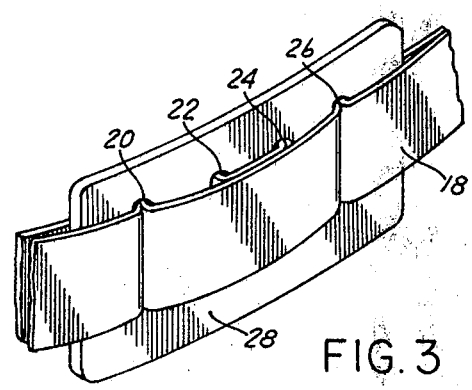
FIG. 3 is an enlarged perspective view of the strap fastener and strap shown in FIG. 1.

This method allows the strap 18 to be secured tightly to the fastener from a roll of material 42 without the use of special tools. In addition, as shown in FIG. 3, with the strap 18 secured to the fastener 16, a smooth appearance is presented and there are no exposed strap ends.

Figure 9:
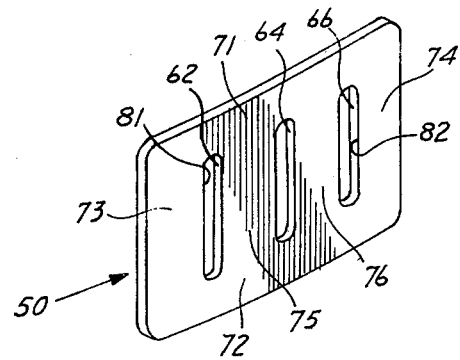
FIG. 9 is a perspective view of a three-slot strap fastener embodying features of the present invention.
Figure 10:
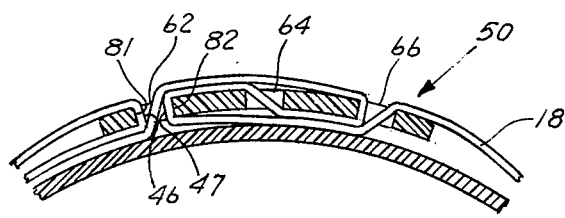
FIG. 10 is a cross-sectional view showing the strap fastener of FIG. 3 with the strap secured to the fastener and around an object.

Referring now to FIG. 9, an alternative three-slot fastener 50 is shown having slots 62, 64 and 66. The method of securing the strap to the three-slotted fastener 50 is the same as previously explained for the four-slotted fastener 16 except that a single slot 62 on the three-slotted fastener 50 takes the place of two parallel spaced slots 20 and 22 on the four-slot fastener 16. FIG. 10 shows a three-slot fastener 50 with a strap secured thereto.

The plate with three slots has opposed side portions 71 and 72, opposed end portions 73 and 74 and intermediate portions 75 and 76. This slot arrangement provides a pair of oppositely disposed inside edges 81 and 82 around which the opposite strap end portions of the strap 18 are looped and held in place in the same manner as the four-slot fastener above described.

While the three-slot fastener 50 is a simpler construction than fastener 16, FIG. 2, in practice the four-slot fastener 16 is preferred for strapping protective jackets using the plastic materials and sizes above described because it avoids having the straps pass through any one slot more than twice. Note in FIG. 10 that the fastener passes through slot 62 three times. The four-slot arrangement allows for narrower slots for any given fastener.

Thus the invention provides a method and apparatus that allows objects to be tightly strapped without the need for special tools. In addition, there are no projecting surfaces or loose ends with the fastener and method of the invention. Moreover, the fastener can be disconnected and reused as necessary, again without the need for special tools.

While the present invention has been described with a certain degree of particularity, it is understood that the present disclosure has been made by way of example and that changes in details of structure may be made without departing from the spirit thereof.

What is claimed is:

1. A method of securing a length of strap around an object and to a fastener having an outer face and an inner face and having slot means including first and second opposed inside edges, an intermediate slot, and an end slot, said method comprising the steps of:
  threading a first end portion of the strap from the outer face of the fastener through said fastener between said first and second inside edges, then along the inside face of the fastener and out through said end slot;
  pulling said first end portion of the strap around the object;
  threading said first end portion of the strap from the outside of the fastener through the fastener between the inside edges and folding said first end portion back upon itself to form a first strap looped end portion;

pulling a second end portion of the strap while holding the fastener to tighten the strap around the object;

threading said second end portion of the strap from the outside face through said intermediate slot, along said inner face, and out through said end slot to form a second strap looped end portion; and folding the second end portion of the strap from the outer face of the fastener back upon itself and then through the fastener between said inside edges.

2. The method as defined in claim 1 wherein the opposite end of the strap remains attached to a roll of material and is cut before threading the second end portion from the outer face of the fastener back through said intermediate slot.

3. The method as defined in claim 1 wherein the terminal end of said second end portion is finally inserted between said first strap looped end portion and said object.

* * * * *